(No Model.)
J. A. JEWELL.
BRAKE BLOCK.
No. 407,075. Patented July 16, 1889.
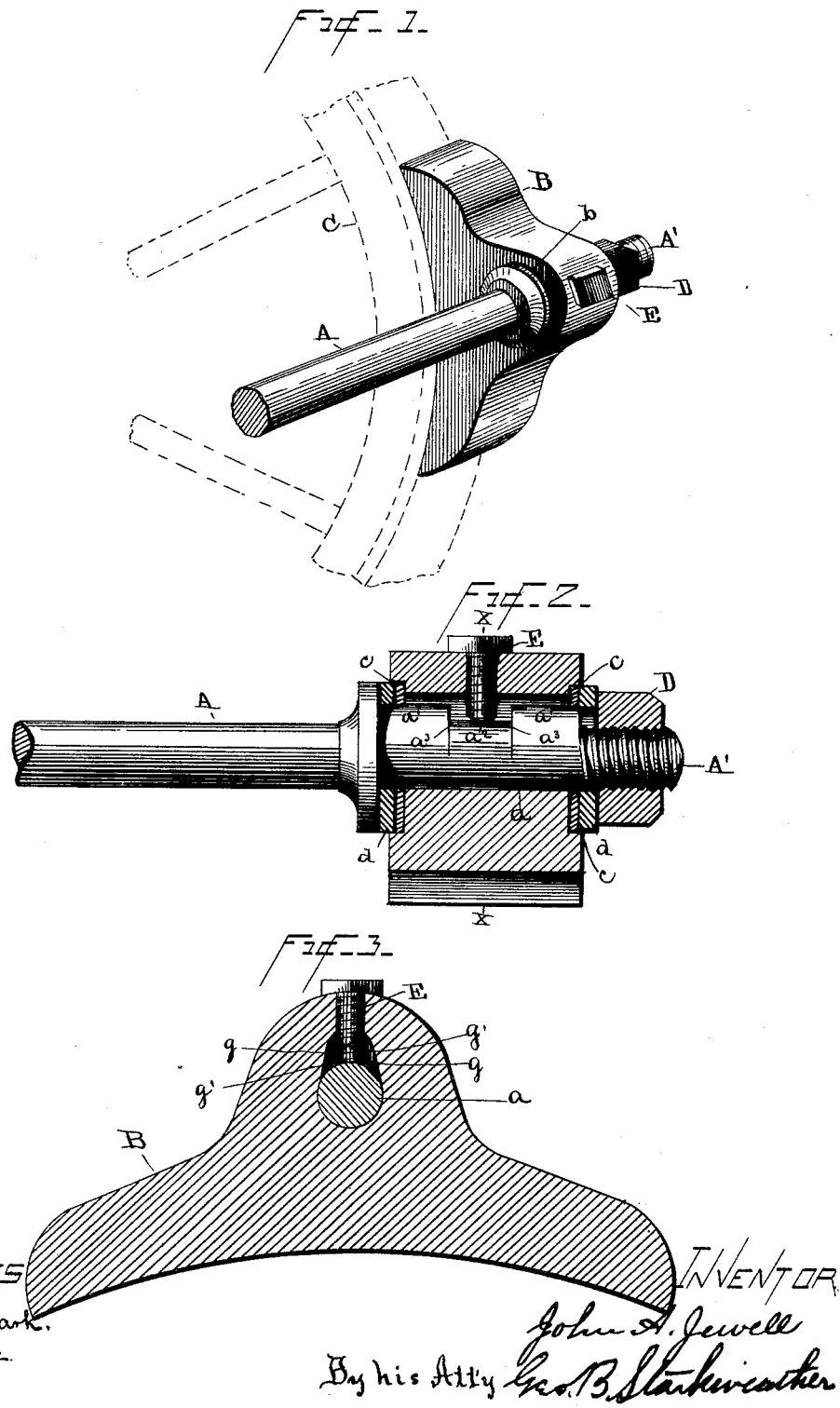

UNITED STATES PATENT OFFICE.

JOHN A. JEWELL, OF WASHINGTON, DISTRICT OF COLUMBIA, ASSIGNOR OF ONE-HALF TO GEORGE B. STARKWEATHER, OF SAME PLACE.

BRAKE-BLOCK.

SPECIFICATION forming part of Letters Patent No. 407,075, dated July 16, 1889.

Application filed September 26, 1888. Serial No. 286,460. (No model.)

*To all whom it may concern:*

Be it known that I, JOHN A. JEWELL, a citizen of the United States, residing in Washington city, in the District of Columbia, have invented certain new and useful Improvements in Brake-Blocks, of which the following is a full, clear, and exact description, reference being had to the annexed drawings, which form a part of this specification.

Figure 1 represents a perspective sectional view showing my brake-block applied to a wheel, part of which is broken away. Fig. 2 is a sectional view of the brake-block and a full view of the brake-rod. Fig. 3 is a vertical transverse section through Fig. 2 in the plane indicated by dotted line $x\ x$ thereon.

The object of my invention is mainly to prevent the automatic action of the brake-block from being impeded by reason of mud, gravel, or other débris, and also to prevent the rattling noise so objectionable to metallic blocks having automatic play.

Before describing my device I shall point out certain advantages therein as follows: first, a simplicity of construction which enables the driver to remove or replace the blocks without the assistance of a blacksmith; second, the absolute protection of all the working parts; third, provision for the irregularity resulting from a sprung axle or other cause; fourth, provision for the dishing or other change in the position of the periphery of the wheel, which may result from resetting the tire and other causes; fifth, the suppression of the rattling noise; sixth, the automatic adjustability of the brake-blocks under all these varying conditions; seventh, this block cannot turn over, and, owing to its perfectly symmetrical proportions, can be either interchanged or reversed at any moment—a very desirable feature possessed by no other block having automatic action. My invention insures an even pressure and wear upon the block and periphery of the tire. It will also be observed from the following description that I compactly inclose the wearing joint between washers which exclude all grit or other matter, thus insuring perfectly free oscillatory and lateral motion thereon under all circumstances.

In the annexed drawings, to show a practical mode of carrying my invention into effect, let A designate a brake-bar; B, a brake-block and shoe combined; C, a wheel. I prefer to construct this block of metal, with an eye portion $b$ integral therewith, the interior of which is adapted to receive a section $a$ of the brake-bar A. This section is constructed with offsets $a'\ a'$, leaving a segmental circular concentric groove which is coincident with the longitudinal axis of the bar A; also shoulders $a^3\ a^3$, for a purpose hereinafter explained.

It will be observed by reference to Fig. 2 that the bar A has a reduced screw-threaded extension A' formed on it. Now, in combination with this bar it will further be seen that I recess the outer and inner sides of the eye portion $b$, as shown at $c\ c$, and into these recesses I insert elastic washers, preferably made of leather, against which metal plates $d$ will be pressed by adjusting the nut D on the screw A'. Through the eye portion on lug $b$ is tapped a screw E, the inner end of which barely impinges against the concentric portion $a^2$ of the shaft or section $a$. This screw is designed to prevent the possible loss of the brake-block in case the nut D should work off, and also to prevent rattling—a defect which has heretofore been very annoying in metallic brake-blocks. Now, again, it will be observed by reference to the section, Fig. 3, that the lugs or portions $a'\ a'$ have free play in a recess $g$, formed in the lug $b$ above the axis X X of the shaft A and between the shoulders $g'\ g'$. In practice the packing and the washers are not only interchangeable, but it is obvious that the one can be substituted for the other, and that the single nut, or, if desirable, a jam-nut, may be used, so that while a free oscillation of the block is allowed about a given point it cannot choke or clog with mud, gravel, and other débris. It is thus seen that I have produced an interchangeable reversible brake-block and shoe combined that is free to accommodate itself to the periphery of a wheel under all circumstances and absolutely free from noise.

Having described my invention, what I claim, and desire to secure by Letters Patent, is—

1. A brake-block B, having a lateral aperture through it provided with a seat for the shaft A, and shoulders $g'$ $g'$, as specified.

2. The combination, with a brake-block recessed as described, and provided with shoulders $g'$ $g'$, of a shaft or brake-bar having a flange $a$ and washers $d$ $d$, as specified.

3. The combination, with a brake-block recessed as described, of elastic or endwise-yielding washers and a flanged brake-bar, as specified.

4. The combination, with a brake-block, of washers which are interchangeable, and a compressing-nut, with a shaft A, and intermediate shoulders $g'$ $g'$, and a stop-screw, as specified.

5. The combination, with a brake-block having integral therewith an eye portion $b$, both sides being flush with the sides of the block, of a lug-stop on the brake-shaft, whereby the block is allowed only a limited oscillation about the axis of its shaft, as specified.

6. A brake-block having an eye or lug protruding from its back and adapted to afford internal shoulders for a brake-shaft, as specified.

7. A brake-block B, having a lug provided with a semicircular aperture transversely through it, terminating in converging shoulders or abutments $g'$ $g'$, in combination with the shaft-section $a$, having a concentric portion $a^2$ between two lugs $a'$ $a'$, and a screw E, tapped through the brake-block lug $b$ and entering the free space between the said lugs $a'$ $a'$, all substantially as specified.

8. The combination of a brake-block having a lug $b$, recessed as described, with the lugs $a'$ $a'$, and the intermediate concentric portion $a^2$, formed on the shaft $a$, and a screw E, tapped through the lug on the brake-block, substantially as specified.

9. The combination, with the brake-block having a lug formed integral with it and recessed as described, of the shaft portion $a$, having two lugs $a'$ $a'$, and an intermediate concentric portion $a^2$, the set-screw E, washers fitted into recesses $c$ $c$, and a nut D, all substantially as described.

10. The combination, with a brake-block having a lug recessed as described, a brake-shaft having a portion $a$, provided with lugs $a'$ $a'$, and an intermediate concentric cylindrical portion $a^2$, of a screw E, entering the broad space between said lugs $a'$ $a'$, and yielding or elastic washers recessed into both sides of the brake-block lug, substantially as specified.

In testimony whereof I affix my signature in presence of two witnesses.

JOHN A. JEWELL.

Witnesses:
OTTO LANDGRAF,
ANSON S. TAYLOR.